Nov. 7, 1944.     E. R. DANIELSON     2,362,053
QUICK CHANGE STRUCTURE FOR BORING BARS
Filed March 4, 1943
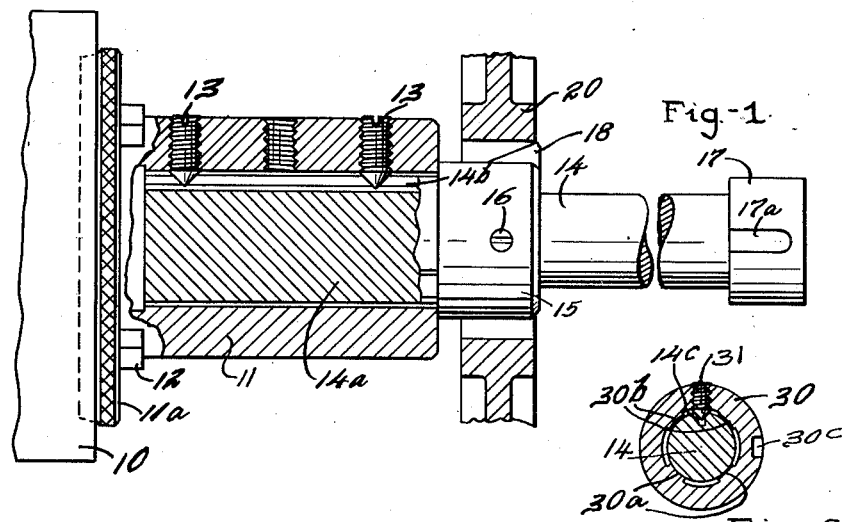
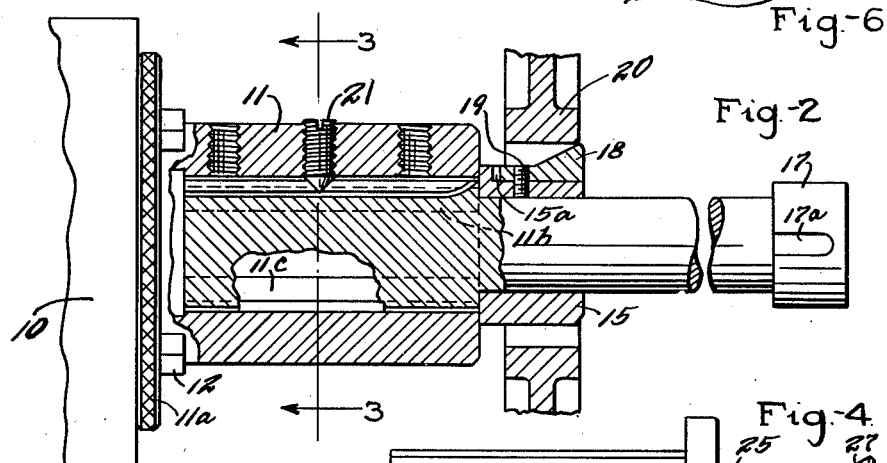
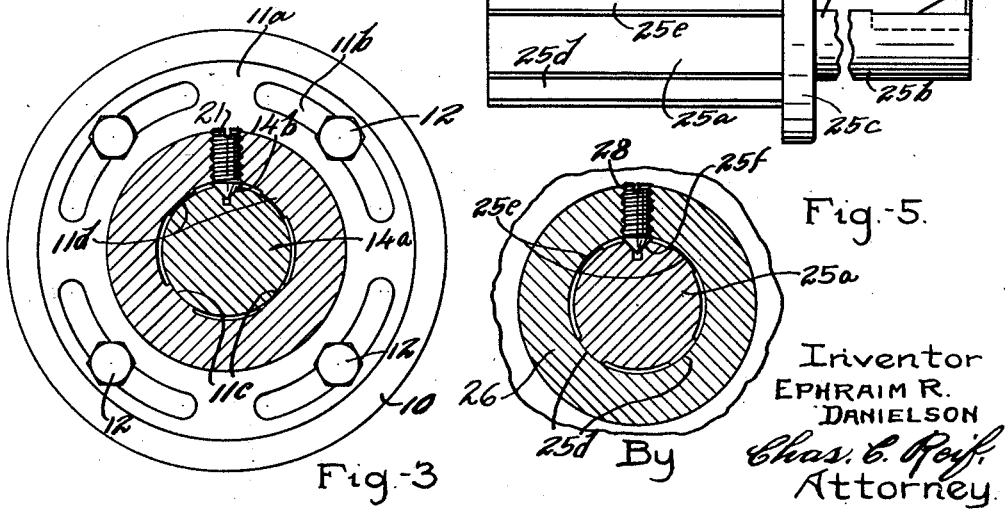
Inventor
EPHRAIM R. DANIELSON
By Chas. C. Reif.
Attorney Patented Nov. 7, 1944

2,362,053

UNITED STATES PATENT OFFICE 2,362,053

QUICK-CHANGE STRUCTURE FOR BORING BARS

Ephraim R. Danielson, St. Paul, Minn.

Application March 4, 1943, Serial No. 477,960

8 Claims. (Cl. 77—58)

This invention relates to a tool holding means and particularly to such a means designed for use in doing very accurate or high precision work.

While the invention could be applied to various tools, in the embodiment of the invention illustrated it is shown as applied to a boring bar. There are now in use and sold commercially, high speed boring machines. In boring many parts where an accurate bore is required, it is a common practice to first make a roughing cut with the boring bar which brings the bore to approximate dimension and then to make a finishing cut which brings the bar to the exact dimension required. In some work it is required that a bore be within a tolerance of two ten-thousandths of an inch.

A problem has always been encountered of holding the boring bar so that the bar can be changed and brought back to a position where it will repeat a finishing cut with the required accuracy. The tool or bar has a holding portion or shank and this is disposed within the bore of a thimble or other holder. It is, of course, impossible to have the bore of the thimble finished accurately to the same dimension as the shank of the tool and get the shank into the bore. If the bore is made somewhat larger so that the shank can be inserted and then held in place by some clamping means there is enough movement of the shank to throw the end of the boring bar out sufficiently to prevent accurate work.

It is an object of this invention to provide a simple and efficient means for holding a tool such as a boring bar so that it may be removed and replaced and brought back to the same position to continue very accurate work.

It is further an object of the invention to provide a boring bar having a shank or holding portion and a holding member such as a thimble having a bore therein, said bore or said shank having thereon circumferentially spaced projections, a pair of which have their surfaces very accurately finished to lie in a certain circumference and others of said projections having their surfaces finished to lie in a circumference of slightly larger diameter.

It is more specifically an object of the invention to provide a tool such as a boring bar having a cylindrical shank or holding portion, a holding member such as a thimble having a bore and having a pair of circumferentially spaced projections in said bore having their surfaces finished accurately to lie in a circumference having a diameter equal to said shank or holding portion and having other projections having their surfaces finished to lie in a circumference of slightly larger diameter together with clamping means, preferably a central screw for holding said shank against said pair of projections.

These and other objects and advantages of the invention will be fully set forth in the following description made in connection with the accompanying drawing in which like reference characters refer to similar parts throughout the several views and in which:

Fig. 1 is for the most part a vertical section through the holding means, the same showing part of the machine and tool in side elevation;

Fig. 2 is a view similar to Fig. 1 showing a slightly different structure;

Fig. 3 is a vertical section taken on line 3—3 of Fig. 2 as indicated by the arrows;

Fig. 4 is a view in side elevation of a modified form of boring bar;

Fig. 5 is a vertical section similar to Fig. 3 showing the bar of Fig. 4 in place; and Fig. 6 is a vertical section through a tool holder and bar showing a modification.

Referring to the drawing a part of a boring machine is shown comprising a rotating head or part 10. A tool holding member or thimble 11 is provided, the same having a flange 11a provided with circumferentially spaced arcuate slots 11b through which extend the screws 12 securing the member 11 to the head 10. Flange 11a is shown as having a knurled edge. In Fig. 1 member 11 is shown as having disposed in threaded holes therein a pair of screws 13 which will be provided with slotted upper ends. A boring bar 14 is provided, the same having a holding portion or shank 14a. Shank 14a is provided with a recess having inwardly inclined sides and while this might take various forms, in the embodiment of the invention illustrated it is shown as a V-shaped slot 14b extending longitudinally of shank 14a throughout practically its whole extent. Bar 14 has secured thereto as by a set screw 16, a tool-carrying collar or holder 15 and has another and similar collar 17 secured at its outer end, the latter being shown as somewhat smaller in size. Members 15 and 17 are provided with tool holding slots 15a and 17a which are adapted to receive cutting tools such as tool 18 shown as held in place by one or more screws 19. The tool 18 will as usual, be provided with a cutting point or edge and is adapted to cut a bore in any desired member such as the casting 20, a part of which is shown in Figs. 1 and 2. Member 11 is also provided with a threaded hole centrally between the holes receiving screws 13 in which is disposed a screw 21 which will preferably have a slotted upper end. Member 11 has a central bore of considerably larger diameter than the diameter of shank 14a. Projecting into this bore at the half thereof opposite the screws 13 and 21 is a pair of projections or lugs 11c. The outer surfaces of these lugs 11c will be very accurately finished to lie in a circumference having a diameter the same as the diameter of shank 14a. Shank 14a is very accurately finished. Member 11 also has another pair of lugs or projections 11d projecting from the side of its bore opposite that from which lugs 11c project and the surfaces of lugs 11d will be finished to lie in a circumference having a diameter slightly greater than the diameter of shank 14a. In one embodiment in practice the shank 14a has a diameter of two inches. The circumference in which lugs 11c have their surfaces will also be finished accurately to a diameter of two inches. The surfaces of lugs 11d were finished to lie in a circumference having a diameter five-thousandths greater than the diameter of shank 14a.

In the use of the device described, shank 14a will be inserted in the bore of member 11. This is made possible on account of the increased diameter of the surfaces of lugs 11d. When the roughing cut is taken the bar will be held by screws 13. When the bar is to be used for the finishing cut it will be held only by central screw 21. With the described construction it will be seen that the bar is held against the two lugs 11c. If the bar is taken out and replaced it will be brought back to exactly the same location and the end of the boring bar will turn within the required tolerance just as it did before being taken out and replaced. With the two lugs 11c and the one screw 21 there is really a three point support for the bar. The central screw 21 only is used for precision work. If the screws 13 would be used one of them might be tightened more than the other and this would have a tendency to tilt the bar very slightly. It will be seen that if the tool at the end of the bar is to cut within two ten-thousandths only a very small displacement in the member 11 would throw the tool end of the bar out sufficiently to prevent accurate work. The lugs 11b are finished to a larger circumference so that the shank of the bar can be easily inserted in member 11. The V-shaped groove or the recess having converging sides when used with the screw 21 also having a conical end assists in accurately positioning the bar and holding it in a definite circumferential position.

Heretofore it has been attempted to have half of the bore of member 11 finished accurately and the other half finished to a larger diameter. It was found impossible however, to hold the bar in such a thimble or holding member so as to do work with the required accuracy. The bar can roll or move laterally sufficiently in a cylindrical bore to throw the tool end of the bar out enough to prevent accurate work.

In Figs. 4 and 5 a modification is shown in which a boring bar 25 is shown having a shank 25a and a tool-carrying portion 25b, the bar having a collar 25c between said portions. A tool 27 is shown secured in a slot in the outer end of bar 25. In this structure the bar 25 has a pair of circumferentially spaced ribs 25d thereon and these will be finished very accurately to a certain diameter, for instance two inches. The bore of member 26 which holds the boring bar and corresponds to member 11 will then be finished as accurately as is possible to a diameter of two inches. Bar 25 is also provided with a pair of ribs 25e spaced at the opposite side thereof from ribs 25d and these ribs 25e will be finished to have their surfaces lie in a circumference of lesser diameter than the circumference in which the surfaces of ribs 25d lie. Bar 25 is also provided with a V-shaped recess or slot 25f. Member 26 will be provided with three threaded holes just as is member 11 and a screw 28 in the central one of these will hold the bar 25 when in position for the finishing cut.

The effect of the structure shown in Figs. 4 and 5 is the same as that shown in the other figures. The bar will always be brought accurately into the same position by the engagement of lugs 25d with the bore of member 26 and will be held accurately in this position by screw 28. As in the other figures there is a three point support. Fig. 6 represents a structure of a tool holder such as 17 embodying the invention. Said holder 30 has a central bore and said bore has circumferentially spaced projections or lugs 30a at one side. The surfaces of lugs 30a will be finished as accurately as possible to be in a circumference having a diameter equal to the diameter of bar 14 where member 30 is located. Member 30 has similar projections 30b circumferentially spaced and at the side of the bore opposite projections 30a. These projections 30b will have their surfaces finished to be in a circumference having a diameter about five thousandths greater than the diameter of bar 14. Bar 14 will have a V-shaped recess or groove 14c therein and holder 30 will be bored and tapped to receive one or more screws 31 having conical ends adapted to seat in groove or recess 14c to press bar 14 against projections 30a. Screw 31 will preferably be provided with a socket in its outer end to receive a tool for turning it. Holder 30 has a tool-receiving slot 30c.

Holder 30 has high utility in holding a tool for back boring or counterboring. The tool holder can be removed and replaced and will always come back to or be positioned in the same place so that very accurate work can be done and continued. Obviously bar 14 could carry the projections instead of tool holder 30 as is illustrated in Figs. 4 and 5.

From the above description on it will be seen that I have provided a very simple and yet highly efficient structure for accurately holding a tool to do precision work. The tool or boring bar can be taken out of the holder and replaced and will always be brought to its one correct position. The invention has solved a serious problem which was encountered in one of the largest and finest machine shops in this country. The structure has been used in boring hundreds of castings and the bars have been repeatedly taken out and replaced either by the same bar or one having a shank or holding portion of exactly the same diameter and yet the tolerance of the bores in the finished articles was held within two ten-thousandths of an inch. Work is often held within one ten-thousandth of an inch. In one instance 2500 gears were bored and all held within a tolerance of two ten-thousandths of an inch. With the invention the work has been turned out with much greater speed than before, and as stated, the required precision has been consistently maintained. In many cases the structure obviates the necessity for expensive jigs and fixtures. The problems arising in attempting precision work, particularly at great speed, are among the most baffling of all encountered in machine work. In the present case applicant has hit upon a solution of one of these problems which has produced remarkable results. The invention has thus been amply demonstrated in actual practice and found to be highly successful and efficient. The projections 11d, 25e and 30b act to preserve the balance of the parts at the high speeds used and thus prevent vibration. In the claims herein the bars 14 and 25 and the collar 17 and the cutting tools respectively carried thereby have been referred to collectively as a tool. The cutting tools 18 and 21 are differentiated from the general term tool.

It will of course, be understood that various changes may be made in the form, details, arrangement and proportions of the parts without departing from the scope of applicant's invention, which generally stated, consists in a device capable of carrying out the objects above set forth, in the parts and combinations of parts disclosed and defined in the appended claims.

What is claimed is:

1. A device for holding a tool for doing precision work having in combination, a member supporting a cutting tool, a carrier member for said member, one of said members having a bore and the other having a portion received in said bore, one of said parts having circumferentially spaced cylindrical surfaces forming the engaging means for said bore and portion and disposed well to one side of a diameter of said bore, said cylindrical surfaces and said portion being very accurately finished to a certain diameter and said portion and bore fitting more loosely at the other side of said diameter and means for pressing said members together at said surfaces.

2. The structure set forth in claim 1, said cylindrical surfaces being formed on radially projecting ribs extending longitudinally of said bore.

3. A device for holding a tool for doing precision work and permitting quick change thereof, which tool has a holding portion having in combination, a member adapted to be secured to a rotating means and having a bore therethrough, said holding portion being receivable in said bore and circumferentially spaced cylindrical surfaces on one of said parts forming the engaging means between said portion and bore, said surfaces and said holding portion being very accurately finished to lie in a circumference of predetermined diameter, the remote edges of said cylindrical surfaces being appreciably less than 180 degrees apart and means opposite said surfaces for pressing said holding portion and surfaces into engagement.

4. The structure set forth in claim 3, said last mentioned means being disposed substantially centrally of said bore longitudinally thereof.

5. A device for accurately positioning a boring bar and permitting quick change thereof having in combination, a member adapted to be secured to a rotating means and having a bore therethrough, a boring bar adapted to carry a cutting tool, said bar being receivable in said bore, said bore having circumferentially spaced cylindrical surfaces therein extending longitudinally thereof and disposed well to one side of a diameter of said bore, said surfaces and said boring bar being very accurately finished to a predetermined diameter, said bore at the other side of said first mentioned diameter being finished to a slightly greater diameter and means for forcing said bar against said surfaces.

6. A device for accurately positioning a boring bar and permitting quick change thereof having in combination, a member adapted to be secured to a rotating means and having a bore therethrough, a boring bar adapted to carry a cutting tool, said bar being receivable in said bore, said bore having circumferentially spaced cylindrical surfaces therein disposed well to one side of a diameter of said bore, said surfaces and said boring bar being very accurately finished to a predetermined diameter, said bore at the other side of said diameter having circumferentially spaced cylindrical surfaces finished to lie in a somewhat larger diameter than said first mentioned diameter and means in said member disposed opposite to said first mentioned surfaces for pressing said bar and first mentioned surfaces together.

7. A device for accurately positioning a tool and permitting quick change thereof having in combination, a member supporting a cutting tool, a carrier member for said member, one of said members having a bore and the other having a portion received in said bore, spaced cylindrical surfaces on one of said parts disposed well to one side of a diameter of said bore and forming the engaging means between said portion and bore, said cylindrical surfaces and said portion being very accurately finished to lie in a certain predetermined diameter, said portion having a longitudinally extending groove therein having converging sides and screws threaded into said member having said bore therein having ends receivable in said groove for pressing said portion and said cylindrical surfaces together.

8. The structure set forth in claim 7, said screws being three in number and spaced longitudinally of said member, a plurality of said screws being used to hold said tool for making a rough cut and the central screw being used to hold said member for making a finishing cut.

EPHRAIM R. DANIELSON.